Sept. 24, 1968     W. M. WILLIS     3,402,690
INDICATING DEVICE
Filed Oct. 23, 1965
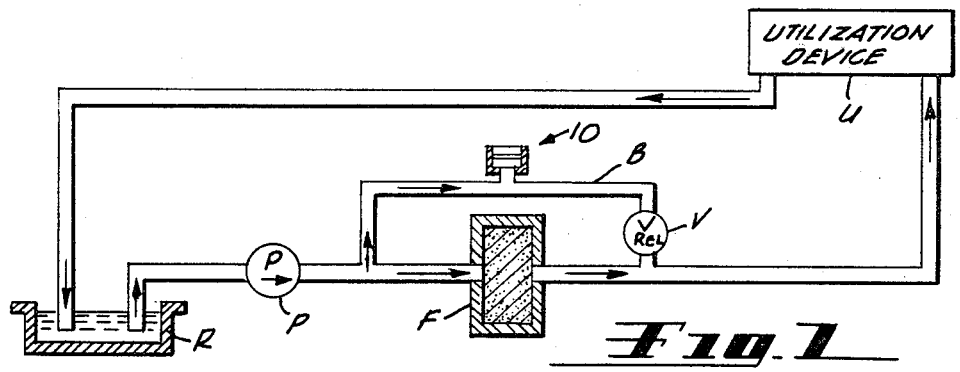
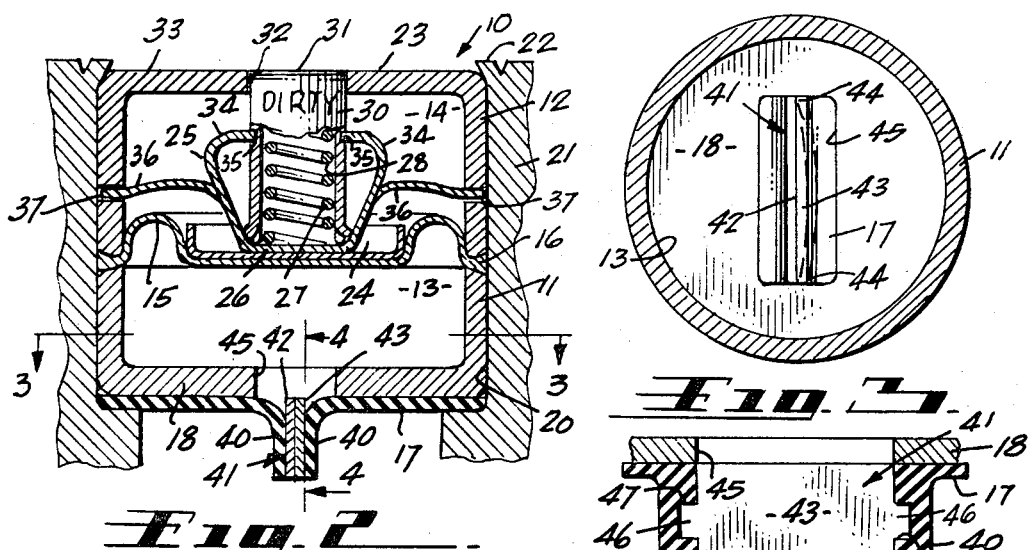
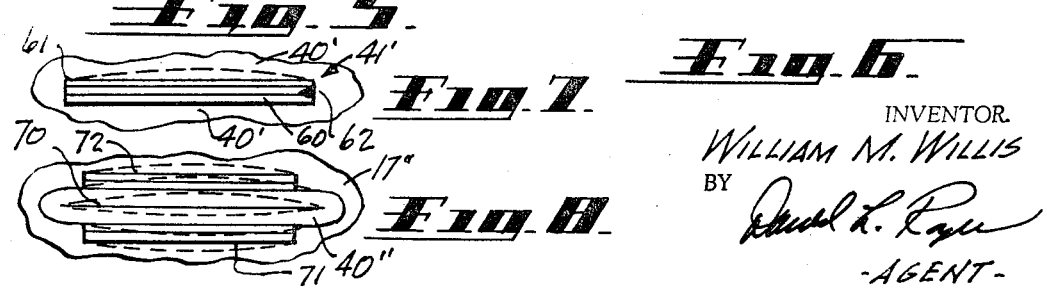
INVENTOR.
WILLIAM M. WILLIS
BY
-AGENT-

United States Patent Office 3,402,690
Patented Sept. 24, 1968

3,402,690
INDICATING DEVICE
William M. Willis, 30490 E. Sunset Drive,
Redlands, Calif. 92373
Filed Oct. 23, 1965, Ser. No. 503,953
14 Claims. (Cl. 116—70)

ABSTRACT OF THE DISCLOSURE

A signaling device for indicating a rise in pressure in a fluid system across a contaminable element of the system. This signaling device incorporates apparatus to prevent operation when low temperature fluid is present or upon pressure surges in the system. Upon a pressure rise held at a predetermined level, a signal is triggered and remains in a triggering position until manually reset.

---

The present invention relates generally to fluid system condition indicating devices, and relates more specifically to an indicating device for use in connection with filter elements or other contaminable fluid flow restricting devices, whereby to provide an indication of the condition of such restricting devices.

In fluid systems such as, for example, the lubricating oil system associated with internal combustion engines, it is common practice to employ a means to filter the fluid circulating through such system. This filtering is normally accomplished by passing the fluid through a container having therein a removable or replaceable filter element. Under normal operating conditions it is common practice to remove and replace the filter element at periodic intervals that have heretofore been determined largely by utilization time on the filter element. This has been necessitated due to the fact that it has been difficult and time consuming to provide periodic tests of the filter element to determine its flow handling capability or the presence of large quantities of flow restricting contaminants therein. For example, it is common practice in maintenance and service of automotive vehicles to replace filter elements in the lubricating oil system at intervals such as every 4,000 to 6,000 miles, with instructions being given to replace the filter more often if the vehicle is used under conditions which may cause greater infusion of contaminants into the oil. The manufacturers' recommendations have been determined through tests which provide a mean time for filter element changing, although in most instances the element will last for a substantially longer time than indicated in such recommendations. Such filter elements are not only relatively expensive, but require service time for the exchange thereof.

In still other instances, when an automotive vehicle is used under conditions where dust particles may enter the oil through a breather system, or in instances where engine malfunction or wear is present, additional contaminants such as metallic particles, sludge, and the like will occlude the filter element in much less than under the normal conditions. Accordingly, most manufacturers of automotive vehicles set the recommended filter changing time at a point to assure protection of the vehicle engine under adverse conditions.

Most recirculating fluid systems are of two types as far as a filtering operation is concerned. The first operation is generally known as a full flow system, wherein all fluid must at all times pass through a filter element. Systems of this type have a disadvantage in that any occlusion of the filter element will necessarily restrict fluid flow to a utilization device, thereby causing inevitable damage to the device. The second and most commonly employed system provides a by-pass passage about the filter element control through a suitable relief valve mechanism, and any occlusion of the filter element will merely cause fluid to circulate around the filter, with unfiltered fluid being delivered to the utilization device in the system.

Various devices and instruments have been employed heretofore to indicate a rise in pressure upstream of any filter element in a fluid circulating system. Upon constant surveillance of such instrumentation, an indication of the flow restricting characteristics of the filter may be obtained. However, in most such systems, it is not always practical to maintain such constant surveillance, and the expense of installation makes such devices impractical. Furthermore, due to changes in the viscosity of fluids in systems of the present type because of temperature changes and the like, indicating devices of the pressure level type provide a false reading during high viscosity conditions. Still further, the fluid demand in systems of this type will vary, causing pressure surges which will also provide a false indication of element condition. In all prior known systems intended to provide an indication of filter element flow restricting condition, the necessity for constant surveillance of any provided instrumentation remains, thus creating an impractical situation and necessitating a need for other indicating methods and devices as set forth herein.

It is, accordingly, one principal object of the present invention to provide a device for indicating flow restriction of a fluid filter element in a fluid delivery or circulation system.

It is another important object of the invention to provide an indicating device for fluid filter elements wherein means are provided to compensate for changes in fluid viscosity.

It is still another object of the invention to provide a fluid filter indicating device that is fail safe and which provides an indication of flow restriction by a filter element, such indication remaining whereby to avoid any necessity for constant surveillance of instrumentation.

Another important object of the invention is to provide a device for indicating fluid flow restriction by a fluid filter element, such device being reliable in use, effective in operation, simple in construction, and economical in manufacture and installation.

A further object of the invention is to provide a filter element condition indicating device wherein combination means are provided to compensate for both thermally induced viscosity changes in fluid, as well as for pressure surges, whereby to eliminate false indications of filter flow restriction.

Other and further important objects of the invention will become apparent from the disclosures from the following detail specification, appended claims and accompanying drawing, wherein:

FIGURE 1 is a schematic flow diagram of a typical fluid system in which the present invention may be used;

FIG. 2 is an enlarged sectional view of one form of the present indicating device showing the device in its initial, non-indicating position;

FIG. 3 is a transverse sectional view taken substantially as indicated by line 3—3, FIG. 2;

FIG. 4 is a sectional view through a temperature compensating means of the present indicating device and taken substantially as indicated by line 4—4, FIG. 2;

FIG. 5 is a fragmentary sectional view similar to FIG. 2 and showing the indicating device in an indicating position;

FIG. 6 is a fragmentary sectional view of a portion of a modified form of the present indicating device;

FIG. 7 is a fragmentary view of a modified form of a thermal compensating mechanism adapted also for pressure surge compensation; and FIG. 8 is a view similar to FIG. 7 showing a further modified form of thermal compensating structure.

With reference to the drawings, and with reference primarily to FIG. 1, the indicating device of the present invention is shown as indicated generally at 10 and adapted for use in conjunction with a fluid system. Such fluid systems may be any type of hydraulic system as employed in many applications to provide a single warning signal. The system may also be used in conjunction with a switch arrangement to provide a remote audible or visual signal. In the illustrated typical system, an oil filter F is provided to which oil is delivered from a reservoir R by means of a suitable pump P. From the filter F fluid is delivered by way of a suitable conduit system to a utilization device U, and from that device may be returned to the reservoir R. A by-pass line B is positioned in the conduit structure above the filter F and is fitted with a relief valve V. The indicating device 10 is normally positioned as shown in communication with the upstream flow to the filter F in the by-pass conduit B and intermediate the valve V and a point in the conduit structure upstream from the filter F. In normal operation of the typical system illustrated in FIG. 1, fluid from the reservoir R is forced through the filter element F and is circulated to the point of use and returned to the reservoir R. Upon occlusion of the filter F and a rise in pressure upstream from the filter, the by-pass valve V will permit flow through the by-pass passage B and to the utilization device U. In systems such as automotive vehicle lubricating oil systems, upon initial starting of the vehicle engine from a cold condition, the high viscosity of the oil at this time will cause an increased pressure upstream of the filter F sufficient to open the valve V and cause flow through the passage B about the filter F. This condition also will exist in some systems in the event of pressure surges which would momentarily open the valve V. The indicating device 10 is therefore positioned to be affected by changes in pressure in the passage B, and it is understood that the passage B may be an integral part of a container for the filter element F, may be located remote from the filter element or may be a simple conduit arrangement as illustrated. For purposes of discussion, it is assumed that a typical condition under which the present indicating device would be operating would involve a cranking pressure prior to the commencement of operation of an engine or the like type of utilization device of from 6 to 10 p.s.i., with the fluid system normally operating at a pressure of approximately 40 p.s.i. Typical drop in pressure across a filter element in an automotive vehicle after 4,000 miles of operation is considered to be in the order of 4 p.s.i. with oil temperature normally operating at approximately 160° F. Also, it is assumed that the fluid utilized in an automotive vehicle lubrication system will be lubricating oil having a viscosity of SAE 30.

With reference to FIG. 2, the indicating device 10 is shown in detail and comprises a rear housing portion 11 and an upper housing portion 12 defining cavities 13 and 14 respectively. The cavities 13 and 14 are separated by means of a flexible diaphragm 15 having a peripheral bead 16 disposed between radially divergent edges of the housing portions 11 and 12. A bladder 17 is positioned against the exterior surface of a bottom wall 18 of the housing portion 11, with the bladder 17, housing portion 11, diaphragm bead 16, and housing portion 12 being retained in position and as a composite unit by disposition in a shouldered recess 20 arranged in a suitable support structure 21. The peripheral edge of the open end of the recess 20 may be staked as at 22 to overlie a portion of an upper wall 23 of the housing portion 12 to retain the described elements in an assembled condition.

The diaphragm 15 may be of any suitable flexible material that is unaffected by the fluid in the system with which the device is used and has a centrally disposed annular cup member 24 positioned adjacent a side thereof in the cavity 14. A compression spring and retainer member 25 has a base portion 26 positioned upon and in the center of the cup member 24. The base member 26 is adapted to confine and support one end of a compression spring 27 that is positioned within an internal bore 28 of an indicating member 30. The indicating member 30 has a closed end 31 and is positioned through an opening 32 in the wall 23 of the housing portion 12. The end 31 of the indicating member 30 is normally positioned coextensive with an outer surface 33 of the wall 23 as shown in FIG. 2.

The indicating member 30 is retained in the position indicated in FIG. 2 whereby to maintain the spring 27 in a compressed condition by means of retainer arms 34 that are formed upwardly and inwardly integrally from the base 26 of the compression retainer and spring structure 25. Ends of the retainer arms 34 are adapted for insertion into notches 35 formed in the exterior surface of the indicating element 30. The structure 25 further includes a pair of spring elements 36 that are formed integrally therefrom and extend upwardly through the cavity 14, with the ends thereof being disposed in openings 37 in the annular wall of the housing portion 12.

The bladder 17 has downwardly extending lip portions 40 between which a thermal compensating element 41 is positioned. The bladder 17, as well as the lips 40, may be made of any suitable flexible material such as rubber or the like. The thermal compensating element 41 is composed of a pair of bi-metallic elements 42 and 43 that are secured together at longtudinal outer ends as indicated at 44 in FIG. 3, with the lower edges thereof being in communication with a central opening 45 in the bottom wall 18 of the housing portion 11. As shown in FIG. 4, the bi-metallic members 42 and 43 are retained in position by means of tabs 46 on longitudinal ends thereof, which are positioned in suitable recesses 47 in an end connecting wall of the lips 40.

In operation the exterior surface of the bladder 17 is subjected to the fluid flowing in the system with which the device is used. This pressure also acts upon the exterior surfaces of the lips 40, as well as the lower edges of the lips and the bi-metallic elements 42 and 43. As long as the fluid in the system is below a predetermined temperature, there will be no flow into the cavity 13. However, if the temperature of the fluid rises, the bi-metallic members 42 and 43 will expand as indicated in an exaggerated manner by the dotted lines in FIG. 3, whereby to admit the fluid under pressure to cavity 13. When the pressure in the cavity 13 is sufficient to overcome the force of the spring arms 36, the diaphragm 15 will be deflected in an upward direction, whereby to remove the retainer arms 34 out of engagement with the notches 35 in the indicating member 30 to cause the spring 27 to move the indicating member 34 to the position shown in FIG. 5, thereby disposing an outer end portion thereof beyond the outer surface 33 of the wall 23 of the housing portion 12. The exposed portion of the indicating member 30 may be suitably colored or marked with a suitable indication that the filter element F is contaminated to the point of restricting flow within the fluid system. Upon replacement of the filter element and restoration of normal flow within the system, the device may be reset by the application of slight pressure upon the end 31 of the indicating member 30, whereby to compress the spring 37 and cause the retainer arms 34 to re-engage in the notches 35. Also, in the event it is suspected that the indication provided by the device may be false, it is only necessary to reset the device by depressing the indicating member 30 and if it then is triggered to be extended as in FIG. 5, confirmation is had of the filter condition.

With reference to the form of the invention illustrated in FIG. 6, similar parts will be indicated by single prime reference numerals. In this form of the invention, a diaphragm 50 is employed having a peripheral bead 51 disposed in a manner similar to the diaphragm 15 between ends of the housing portions 11' and 12'. The diaphragm 50 may b made from any suitable metallic material and is slightly downwardly belled, whereby to have a snap action from its one extreme position to another. The diaphragm 50 is further provided with a central depression 52 which has annular radially inwardly directed bead 53 at the junction between an upper portion of the depression 52 and the main portion of the diaphragm 50. The bead 53 is adapted to be normally positioned in contact with the outer surface of the indicating device 30' and in contact with an annular enlargement 54 on the lower end of the indicating member 30'. The spring 27' is positioned between the closed end 31' of the indicating member 30' and the inner surface of the depression 52. Upon a rise in pressure in the cavity 13' sufficient to overcome the force necessary to deflect the diaphragm 50, the diaphragm 50 will move upwardly, thereby radially outwardly moving the bead 53 and permitting the spring 27' to move the indicating member 30' whereby to extend an outer portion thereof beyond the surface 33' of the wall 23' of the housing portion 12'. The device of this form of the invention may be reset merely upon moving the indicating device 30' to its original position.

In FIG. 7 a form of the invention is illustrated wherein compensation is provided for fluid pressure surges within the system. This form of the invention employs a bi-metallic element indicated generally at 41' which has a generally immovable member 60 to which is attached a bi-metallic element 61. The element 61 is secured to the member 60 as at 62 and adjacent one longitudinal end thereof. The element 61 will expand in much the same manner as the element 41, with the exception that the force of the pressure in the system on the exterior surfaces of the lips 40' will again move the element 61 to terminate communication between the system and the interior of of indicating device. This is accomplished inasmuch as the opening afforded by the bi-metallic element is very slight and amounts to an orifice only, and a substantial differential in pressure will exist between the outer surfaces of the lips 40 and the inner surface of the provided orifice whereby to produce means for closing the orifice or substantially restricting flow therethrough. The member 60, as well as the previously described member 42, may be of relatively rigid material such as carbon, and the bi-metallic element 61 may be of any suitable dissimilar material that are bonded together, whereby longitudinally to bend upon changes in temperature. As previously described, the element 43 is also of a material dissimilar from the material of the element 42 and may be, for example, of aluminum. The differences between these two elements primarily resides in the attachment of the element illustrated in FIGS. 2 and 3 at both ends thereof, while the element of FIG. 7 is attached at a single end thereof.

In FIG. 8 a still further modification of the orifice creating a portion of the present device is illustrated, and wherein the bladder 17" is provided with lips 40" that are positioned in contact with each other along a line 70. In this form, a pair of bi-metallic strips 71 and 72 are positioned respectively on and secured to the outer surfaces of the lips 40" and serve to open the lips along the line 70 with changes in temperature. In this particular form of the invention greater sealing is accomplished between the interior cavity of the indicating device and the system with which it is used.

It may thus be seen that the device of the present invention is relatively simple in construction and operation and provides a desired indication of occulsion of a filter element, may be reset, is fail safe, and inexpensive in construction, manufacture and installation.

Having thus described the invention and the present several embodiments thereof, it is desired to emphasize the fact that many modifications may be resorted to in a manner limited only by a just interpretation of the following claims.

I claim:
1. In an indicating device for use in conjunction with contaminable apparatus in a fluid conduction system, the combination of:
   means for sensing a rise in fluid pressure in said system upstream from said apparatus and above a predetermined fluid pressure level;
   signal means;
   means for retaining said signal means in a nonsignaling attitude;
   means responsive to movement of said sensing means for changing the attitude of said signal means to provide an indication of said rise in fluid pressure; and
   thermally responsive fluid flow restricting means positioned intermediate said system and said sensing means.

2. An indicating device according to claim 1 wherein means are provided for enabling manual resetting of said signal means.

3. An indicating device according to claim 2 wherein means are provided to retain said signal means in said attitude providing said indication of pressure rise until said manual resetting of said signal means.

4. An indicating device according to claim 1 wherein said flow restricting means comprises a bi-metallic element movable in response to temperature changes in said fluid from a flow restricting position to a position defining a fluid flow orifice between portions of said be-metallic element.

5. An indicating device according to claim 4 wherein said fluid flow restricting means includes means, when said restricting means is in said orifice defining position, for closing said orifice upon sudden changes in pressure in said fluid system.

6. An indicating device according to claim 5 wherein said bi-metallic element defines said closing means, there being a single attachment of members of said bi-metallic element to each other at only one lateral end thereof to enable relative movement of said members.

7. An indicating device according to claim 1 wherein said flow restricting means comprises a pair of dissimilar metallic strips secured together at ends thereof; and
   means for retaining said strips in said position intermediate said system and said sensing means.

8. An indicating device according to claim 1 wherein said sensing means comprises a diaphragm; and
   spring means for urging said diaphragm in a direction to oppose movement thereof by said fluid pressure, said spring means being formed as a portion of said signal retaining means.

9. An indicating device according to claim 1 wherein said sensing means movement responsive means for said signal means comprises a compression spring disposed intermediate said sensing means and said signal means.

10. An indicating device according to claim 1 wherein said sensing means comprises a snap acting metallic diaphragm, said signal means retaining means being formed as an integral portion of said diaphragm.

11. An indicating device for use in a filtered fluid conduction system and adapted to be positioned in said system at a position whereby to be exposed to a rise in pressure upstream from a contaminable filter element in said system and above a predetermined pressure level at said position in said system, said indicating device comprising, in combination:
   a body structure;
   a diaphragm carried by said body structure and separating the interior of said body structure into a pair of cavities;
   an inlet to one of said cavities, said inlet providing fluid communication between said one of said cavities and fluid under pressure at said position in said system;

a signal member positioned in the other of said cavities and having a free end thereof normally positioned laterally coextensive with an exterior exposed surface of said body structure;

spring means for biasing said signal member in a direction to cause visible protrusion thereof from said body structure;

latch means in said other of said cavities and operably coupled to said diaphragm for retaining said signal member in said normal position, said latch means being actuated to release said signal member to cause movement of said signal member upon movement of said diaphragm toward said other of said cavities; and a temperature responsive bi-metallic element positioned in said inlet to said one of said cavities to limit fluid flow to said one of said cavities only upon a rise in temperature of said fluid above a predetermined level.

12. An indicating device according to claim 11 wherein said bi-metallic element provides an orifice into said one of said cavities and, when said bi-metallic element is in an orifice defining position, means are provided momentarily to close said orifice upon fluid pressure surges in said system.

13. An indicating device according to claim 11 wherein a flexible bladder is provided and positioned adjacent an end of said body structure containing said inlet, said bladder having protruding lips, said bi-metallic element being positioned between said lips.

14. An indicating device according to claim 13 wherein said bi-metallic element provides an orifice into said one of said cavities and, when said bi-metallic element is in an orifice defining position, fluid pressure acting upon exterior surfaces of said lips during surges in said fluid pressure serves momentarily to close said orifice.

References Cited

UNITED STATES PATENTS

| | | | |
|---|---|---|---|
| 3,117,550 | 1/1964 | Cole | 116—70 |
| 3,250,873 | 5/1966 | Kudlaty et al. | 116—70 X |

S. CLEMENT SWISHER, *Acting Primary Examiner.*

JOSEPH W. ROSKOS, *Assistant Examiner.*